US012650925B2

(12) United States Patent
Liu et al.

(10) Patent No.: US 12,650,925 B2
(45) Date of Patent: Jun. 9, 2026

(54) DATA EVICTION METHOD AND APPARATUS, CACHE NODE, AND CACHE SYSTEM

(71) Applicant: HUAWEI CLOUD COMPUTING TECHNOLOGIES CO., LTD., Guizhou (CN)

(72) Inventors: Jiacai Liu, Xi'an (CN); Weihua Shan, Xi'an (CN); Yi Jing, Shenzhen (CN)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 0 days.

(21) Appl. No.: 18/347,334

(22) Filed: Jul. 5, 2023

(65) Prior Publication Data

US 2023/0342300 A1 Oct. 26, 2023

Related U.S. Application Data

(63) Continuation of application No. PCT/CN2021/143387, filed on Dec. 30, 2021.

(30) Foreign Application Priority Data

Jan. 7, 2021 (CN) .......................... 202110019585.1

(51) Int. Cl.
*G06F 12/0891* (2016.01)
*G06F 12/122* (2016.01)
*G06F 12/126* (2016.01)

(52) U.S. Cl.
CPC ........ *G06F 12/0891* (2013.01); *G06F 12/122* (2013.01); *G06F 12/126* (2013.01)

(58) Field of Classification Search
CPC .. G06F 12/0891; G06F 12/122; G06F 12/126; G06F 16/172; G06F 16/9574;
(Continued)

(56) References Cited

U.S. PATENT DOCUMENTS 10,387,330 B1 * 8/2019 Colglazier ............ G06F 12/122
2012/0054444 A1 * 3/2012 Wang ...................... G06F 16/27
711/E12.001
(Continued)

FOREIGN PATENT DOCUMENTS

CN 103984736 A 8/2014
CN 104239234 A 12/2014
(Continued)

OTHER PUBLICATIONS

Extended European Search Report in European Appln No. 21917345. 7, dated Mar. 11, 2024, 8 pages.
(Continued)

*Primary Examiner* — Larry T Mackall
(74) *Attorney, Agent, or Firm* — Fish & Richardson P.C.

(57) ABSTRACT

Example data eviction methods and apparatus are described. One example method includes obtaining an access frequency and an access time of data, where the access frequency is a quantity of access times in a target time period, and the target time period is a part of an eviction period. An eviction priority of the data is determined based on the access frequency and the access time. The data is evicted in a cache system based on the eviction priority.

17 Claims, 8 Drawing Sheets

Part 1 Part 2 Part 3 Part 4 Part 5 Part 6 Part 7 Part 8 Part 9 Part 10 Part 11 Part 12 Part 13 Part 14 Part 15 Part 16

Time sequence

| 0 | 1 | 0 | 0 | 1 | 0 | 0 | 1 | 1 | 0 | 1 | 1 | 0 | 0 | 1 | 0 | 0 | 1 | 1 | 1 | 0 | 1 | 0 | 0 | 1 | 1 | 0 | 0 | 1 | 1 | 0 | 0 |

Access behavior time sequence (behavior portrait)

(58) Field of Classification Search
CPC .............. G06F 16/958; H04L 67/5682; H04N 21/23106; H04N 21/23113; H04N 21/251
See application file for complete search history.

(56) References Cited

U.S. PATENT DOCUMENTS

| | | | | |
|---|---|---|---|---|
| 2012/0198174 A1* | 8/2012 | Nellans | ................... | G06F 3/065 |
| | | | | 711/E12.009 |
| 2014/0185815 A1* | 7/2014 | Roblek | ................. | G06F 16/683 |
| | | | | 381/56 |
| 2015/0039784 A1* | 2/2015 | Westphal | ................ | H04L 45/44 |
| | | | | 709/240 |
| 2019/0354489 A1 | 11/2019 | Gupta et al. | | |

FOREIGN PATENT DOCUMENTS

| | | |
|---|---|---|
| CN | 105224560 A | 1/2016 |
| CN | 111176560 A | 5/2020 |
| CN | 111858403 A | 10/2020 |

OTHER PUBLICATIONS

International Search Report and Written Opinion in International Appln. No. PCT/CN2021/143387, mailed on Mar. 29, 2022, 16 pages (with English translation).

* cited by examiner

Client 101 Cache node 102 Source server 103

Client 101 Cache node 102 Cache node 104 Source server 103

Obtain an access frequency and an access time of data    301

Determine an eviction priority of the data based on the access frequency and the access time    302

Evict the data in a cache system based on the eviction priority    303

(a) Data writing procedure          (b) Data reading procedure

Computing device 600

DATA EVICTION METHOD AND APPARATUS, CACHE NODE, AND CACHE SYSTEM

CROSS-REFERENCE TO RELATED APPLICATIONS

This application is a continuation of International Application PCT/CN2021/143387, filed on Dec. 30, 2021, which claims priority to Chinese Patent Application No. 202110019585.1, filed on Jan. 7, 2021. The disclosures of the aforementioned applications are hereby incorporated by reference in their entireties.

TECHNICAL FIELD

The present invention relates to the field of information technologies, and in particular, to a data eviction method and apparatus, a cache node, a cache system, a computer program product, and a non-volatile storage medium.

BACKGROUND

A content delivery network (CDN) solution is developed to resolve increasing content transmission, storage, distribution, and other problems on the internet, relieve pressure on a backbone transmission network and a website source server, and provide better access and user experience for an end user. In a CDN, a layer of a new network architecture is added to an original internet, and the CDN includes ubiquitous high-performance server nodes connected at a central/regional/edge layer. The server nodes cache service content according to a specific cache policy. When a user accesses specific service content, a request is scheduled to a nearest server node to the user, and the server node directly and quickly responds to the request of the user, to effectively reduce a user access latency, improve user access experience, and relieve the pressure on the source server and the backbone network.

Due to a storage capacity limitation, each edge node of the CDN caches some content of the source station server. If the content requested by the user cannot be obtained from the edge node of the CDN, that is, a cache miss of the edge node occurs, the request is forwarded to the source station, resulting in a high request latency and reduced user experience. Therefore, the content cached by the edge node of the CDN is significant. When the cache of the edge node is full, how to evict old data is critical.

In a design of a cache system, one important objective is to use least space to cache most useful data. A hit rate of a cache is a primary consideration in the design of the cache system. In this case, accurately predicting a probability that an object in the cache is accessed again in the future is a key to improving the hit rate of the cache.

SUMMARY

This application provides a data eviction method and apparatus, a system, a cache node, a computer program product, and a non-volatile storage medium, to effectively improve a hit rate of the cache system.

According to a first aspect, this application provides a data eviction method. A cache node in a cache system may be configured to perform the method. The method includes: obtaining an access frequency and an access time of data; determining an eviction priority of the data based on the access frequency and the access time; and evicting the data in a cache system based on the eviction priority. In addition, in addition to the cache node in the cache system, a cache system of any size or a subsystem thereof may be configured to perform the method.

In this method, the eviction priority is determined by simultaneously considering the access frequency and the access time of the data. Evicting the data in the cache system based on the eviction priority can ensure a hit rate of the data in the cache system In a possible design of the first aspect, the access frequency is a quantity of access times in a target time period. The target time period is a part of an eviction period. Duration of the part of the eviction period is less than total duration of the target time period. The target time period is divided into a plurality of time subperiods. Quantities of access times or access frequencies in the plurality of time subperiods are respectively obtained. Optionally, the target time period may be an eviction period of the cache system. In other words, quantities of access times or access frequencies in different time subperiods in the eviction period are obtained.

In a possible design of the first aspect, an access behavior time sequence is determined based on the access frequency and the access time. The time sequence is a quantity of access times or an access frequency in a time subperiod arranged according to a time sequence. This design can reflect a change with time of the access frequency in a period of time.

In a possible design of the first aspect, the access behavior time sequence is input into a preset algorithm, and the eviction priority of the data in the cache system is calculated. Compared with an access frequency and a quantity of access times in an existing algorithm, the access time sequence may transmit more information, for example, a total quantity of access times, an access time interval, a last access time, and a degree of access aggregation. A more proper eviction priority can be calculated according to the preset algorithm.

In a possible design of the first aspect, access feature information is determined based on the access behavior time sequence. The access feature information is input into a preset algorithm, and the eviction priority of the data in the cache system is calculated.

In a possible design of the first aspect, the access feature information includes one or a combination of the following: the quantity of access times, an access time interval, a last access time, and a degree of access aggregation. The access behavior sequence itself may alternatively be input into the preset algorithm as the feature information. The feature information describes characteristics of an access behavior from a plurality of dimensions.

In a possible design of the first aspect, the preset algorithm includes one or a combination of the following: a deep learning algorithm, a machine learning algorithm, a clocked least frequently used by size (CLFUS) algorithm, a least recently used (LRU) algorithm, and a least frequently used (LFU) algorithm. When there are many types of feature information, the deep learning algorithm and machine learning algorithm can improve eviction efficiency.

In a possible design of the first aspect, when a request for writing new data is received, the data in the cache system is evicted based on the eviction priority, to write the new data into the cache system. According to this method, data with a high eviction priority in the cache system is evicted, to improve utilization of the cache system.

According to a second aspect, this application provides a data eviction apparatus. A plurality of functional modules included in the apparatus are configured to implement different steps of the method provided in any one of the first aspect or the possible designs of the first aspect.

According to a third aspect, this application provides a cache system. The cache system includes one or more cache nodes.

In a possible design of the third aspect, the cache node deploys the data eviction apparatus provided in the second aspect.

According to a fourth aspect, this application provides a cache node. The cache node includes a processor and a memory. The processor executes instructions stored in the memory, so that the cache node performs the method provided in any one of the first aspect or the possible designs of the first aspect.

This application provides a cache node. The cache node includes a processor and a memory. The processor executes instructions stored in the memory, so that the cache node deploys the apparatus provided in the second aspect.

According to a fifth aspect, this application provides a computer-readable storage medium. The computer-readable storage medium stores instructions. When a processor of a cache node executes the instructions, the cache node performs the method provided in any one of the first aspect or the possible designs of the first aspect.

This application provides a computer-readable storage medium. The computer-readable storage medium stores instructions. When a processor of a cache node executes the instructions, the cache node implements the apparatus provided in the second aspect.

According to a sixth aspect, this application provides a computer program product. The computer program product includes instructions, and the instructions are stored in a computer-readable storage medium. A processor of a cache node may read the instructions from the computer-readable storage medium. The processor executes the instructions, so that the cache node performs the method provided in any one of the first aspect or the possible designs of the first aspect.

This application provides a computer program product. The computer program product includes instructions, and the instructions are stored in a computer-readable storage medium. A processor of a cache node may read the instructions from the computer-readable storage medium. The processor executes the instructions, and the cache node implements the apparatus provided in the second aspect.

DESCRIPTION OF EMBODIMENTS

The following describes technical solutions in embodiments of the present invention with reference to accompanying drawings.

First, a cache system applicable to embodiments of the present invention is described.

Figure 1:
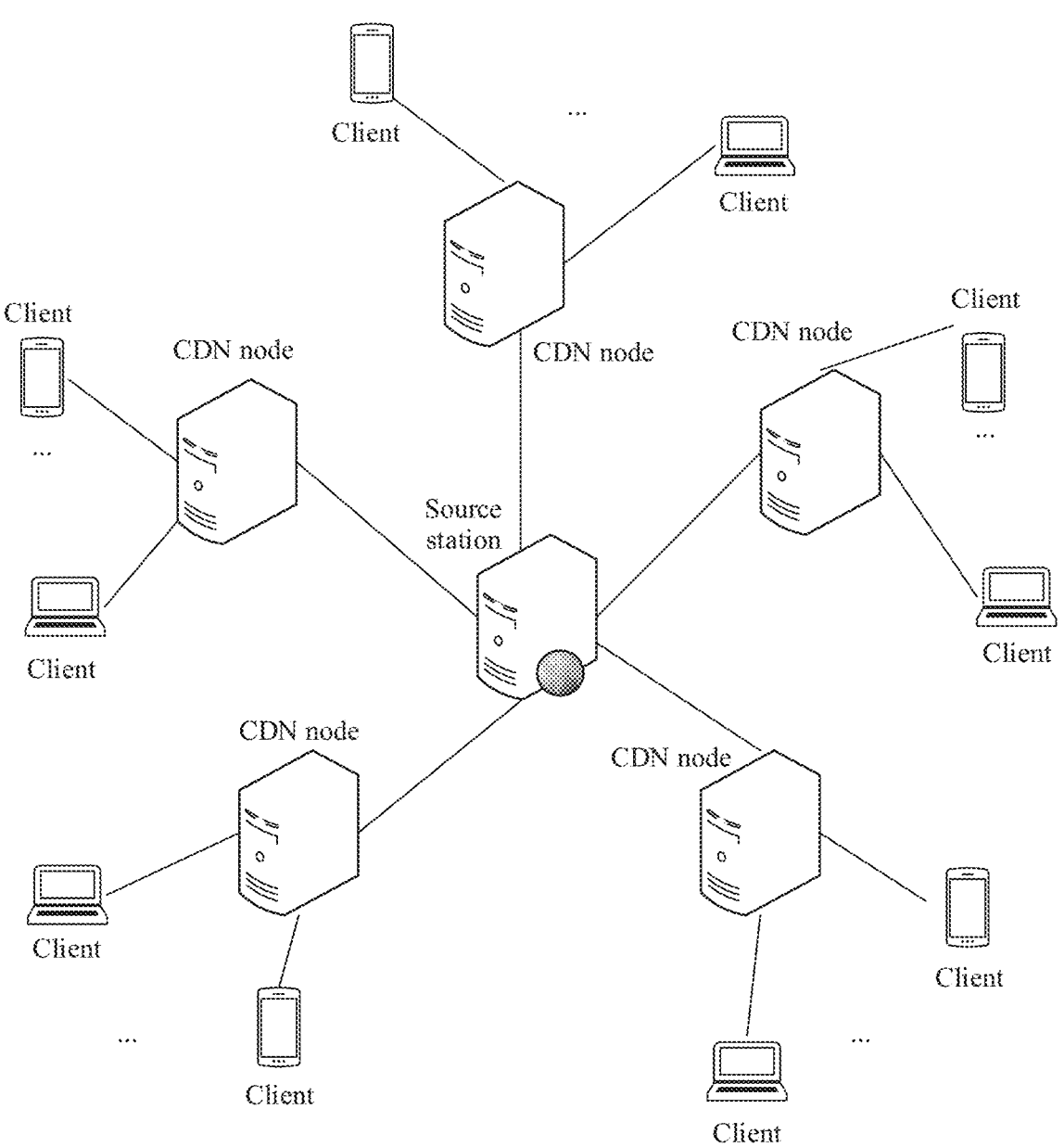
FIG. 1 is a schematic diagram of an example of a network architecture of a CDN cache system according to an embodiment of this application.

FIG. 1 is a schematic diagram of an example of a part of a network architecture of a CDN cache system according to an embodiment of the present invention. Currently, the CDN is generally deployed at a plurality of layers. A node close to a terminal customer is also referred to as an edge node (for example, a CDN node in FIG. 1), and directly serves the terminal customer. If a hit occurs in a local cache of the edge node, data is directly read and output to the terminal customer. If a miss occurs, retrieval from an upper-layer node is performed. If a hit occurs in the upper-layer node, content is returned. If a miss occurs, retrieval from another upper-layer node is performed until the content is returned or retrieval from a source station is performed.

The edge node of the CDN is a large-capacity cache system (PB-level), a complex cache system, and generally a hierarchical cache system. Different cache nodes, such as an edge node and a central node, in the CDN face different objects, and therefore have slightly different configurations, but have same solutions and principles. CDN nodes ensure that content serves a request of a user in an ultra-efficient manner through proximity judgement, server load judgement, cache management, and the like. For example, an L1 edge node of the CDN uses LVS and Nginx for multi-layer load balancing, and for service logic processing and security protection of the cache node. An ATS is used for disk and cache management.

Figure 2:
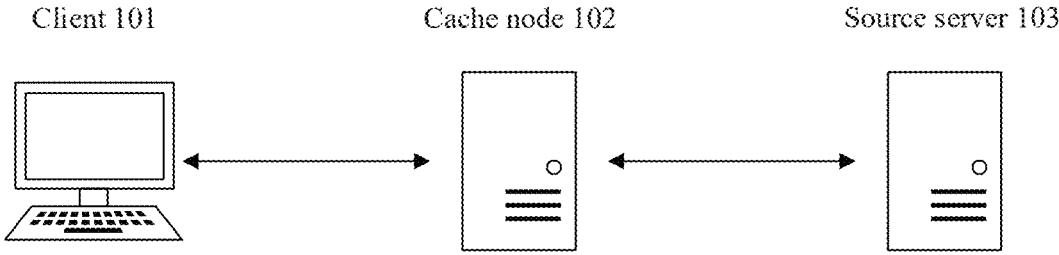
FIG. 2 is a schematic diagram of an example of a cache network architecture according to an embodiment of this application.
Figure 3:
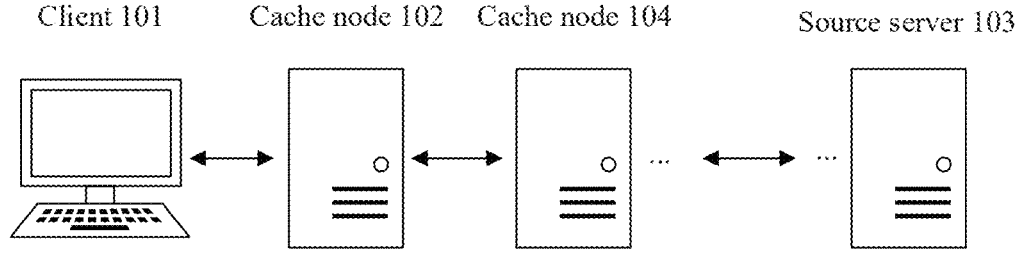
FIG. 3 is a schematic diagram of an example of another cache network architecture according to an embodiment of this application.

FIG. 2 is a schematic diagram of an example of a simple cache network architecture, including a client 101, a cache node 102, and a source server 103. The client 101 may be a terminal device, for example, a PC, a tablet computer, or a smartphone. The cache node 102 is a server on which a cache system is deployed, for example, an L1 edge node of the CDN. The source server 103 is a target server on which the client 101 accesses a resource. FIG. 3 is a schematic diagram of an example of another cache network architecture, which includes a plurality of layers of cache nodes, for example, an upper-layer cache node 104 of a cache node 102. The upper-layer cache node 104 may be an L2 central node or another non-edge cache node. In addition, more upper-layer cache nodes may further exist between the upper-layer cache node 104 and the source server 103 in FIG. 3.

In this embodiment of this application, cache system layering and a difference between cache nodes are not discussed. Only a cache system with a minimum granularity is discussed, for example, Nginx and an ATS (Apache Traffic Server) deployed on the cache node 102 or the upper-layer cache node 104. The Nginx and the ATS have similar architectures and processes. Further, the system and a method in embodiments of this application are not only applicable to a CDN cache system and cache subsystems of different sizes in the CDN cache system, but also applicable to any large-capacity cache system and cache subsystems of different sizes in the large-capacity cache system.

Figure 4:
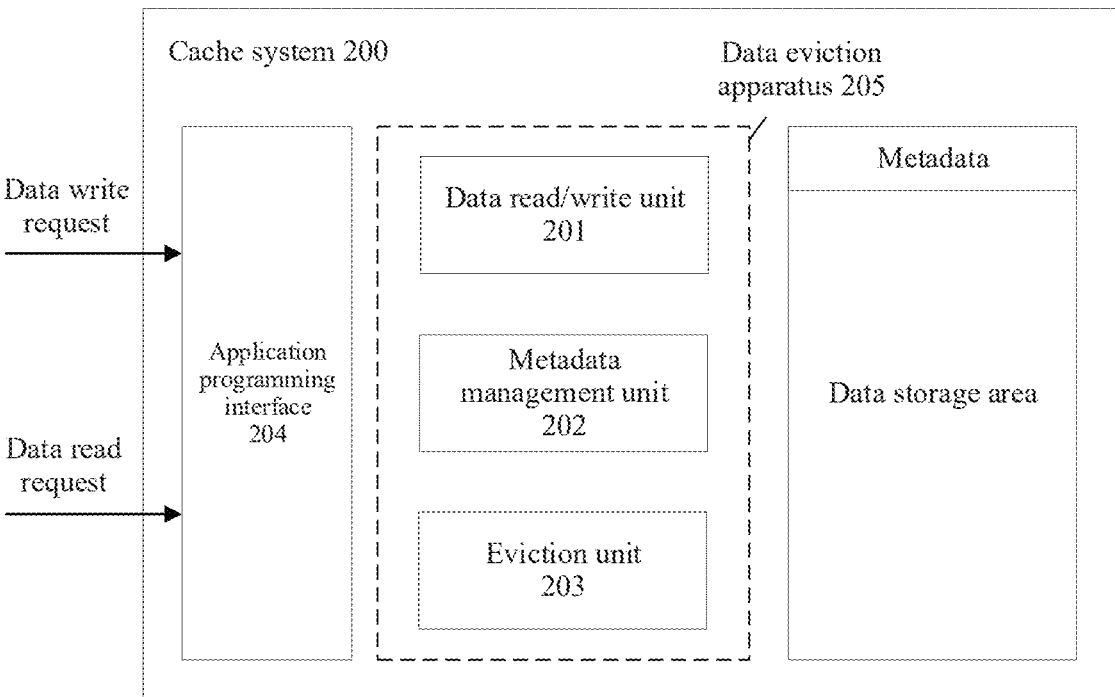
FIG. 4 is a schematic diagram of an example of a structure of a cache system according to an embodiment of this application.

FIG. 4 is a schematic diagram of an example of a structure of a cache system according to an embodiment of this application. The cache system 200 in FIG. 4 includes a data read/write unit 201, a metadata management unit 202, an eviction unit 203, an application programming interface 204, and a data storage area. The cache system 200 is generally deployed in a cache node in a cache network, for example, the cache node 102 in FIG. 2 and FIG. 3 and the cache node 104 in FIG. 3.

The data read/write unit 201 is configured to write data into the data storage area and read data from the data storage area. Before or during data writing, if storage space of the data storage area is insufficient, the eviction unit 203 is triggered to perform data eviction, to clear some storage space for writing new data.

Figure 5:
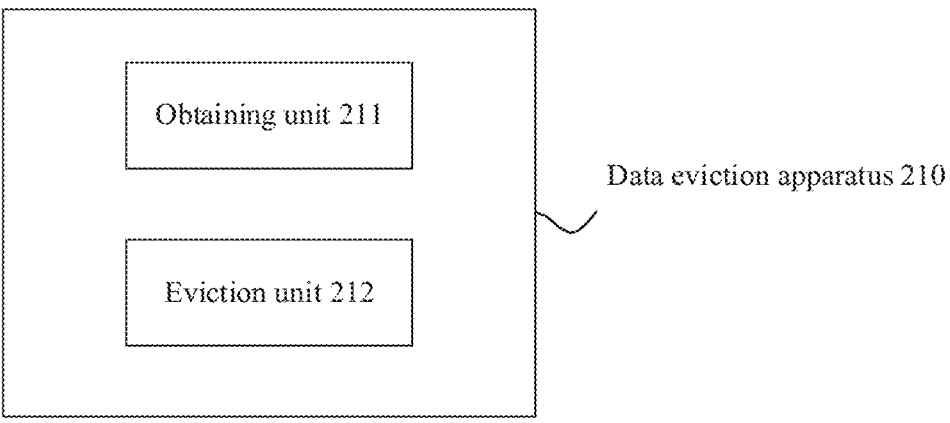
FIG. 5 is a schematic diagram of another example of a structure of a cache system according to an embodiment of this application.

The metadata management unit 202 is configured to update metadata in the cache system. Updating includes adding, modifying, and deleting operations on each piece of metadata. Each piece of data in the data storage area has corresponding metadata. The metadata records important information corresponding to the data, for example, information such as a key, an offset, a size, and an access behavior portrait, as shown in FIG. 5. For details about the behavior portrait, refer to the following descriptions.

The eviction unit 203 is configured to evict data. First, the eviction unit 203 selects, from the metadata, information such as an access behavior time sequence (also referred to as the access behavior portrait in this embodiment of this application), a data size, whether the data is a first frame of a video or a first clip of a file, and uses the information as input data of a preset eviction algorithm. The eviction algorithm calculates an eviction priority of the data in the cache system, and evicts the data based on the eviction priority.

The application programming interface 204 is configured to receive data read and write requests sent by an external device, and establish communication between the external request and the cache system 200.

The data storage area is configured to store read data, written data, and metadata corresponding to the data. The data read/write unit 201, the metadata management unit 202, and the eviction unit 203 jointly form a data eviction apparatus 205 in this embodiment of this application. The data eviction apparatus 205 is configured to evict data read from and data written into the data system, to ensure that the data is evicted in time when the storage area is full. For a specific read and write process, refer to FIG. 6 below.

It should be noted that data, cached data, and a cached object mentioned above or below in embodiments of this application are equivalent expressions, and indicate data read from or written into the cache system.

An embodiment of this application further provides a diagram of an example of a data eviction apparatus. As shown in the figure, the apparatus 210 includes an obtaining unit 211 and an eviction unit 212. The apparatus 210 is another module division manner of the apparatus 205.

The obtaining unit 211 is configured to obtain an access frequency and an access time of data in an eviction period. The access frequency herein indicates an access frequency in a part of the eviction period. In a possible implementation, the eviction period is divided into a plurality of time subperiods (a part of a time period), and the obtaining unit 211 obtains an access frequency of the data in each time subperiod and a time point at which the time subperiod is located.

The eviction unit 212 is configured to determine an eviction priority of the data based on the access frequency and the access time, and evict the data in a cache system based on the eviction priority.

First, the eviction unit 212 constructs an access behavior time sequence based on the obtained access frequency and access time. In a possible embodiment, the access behavior time sequence is the behavior portrait in embodiments of this application. For details, refer to the foregoing related descriptions.

Then, the access behavior time sequence is input into a preset eviction algorithm, and the eviction priority of the data in the cache system is calculated. In a possible embodiment, information input into the preset algorithm further includes a data size and other information. The input information is usually stored in metadata (FIG. 5), and may be considered as data-related access feature information. In a possible implementation, information such as a quantity of access times, an access time interval, a last access time and a degree of access aggregation of a storage object in the eviction period may be calculated based on the behavior portrait. The information is used as supplementary or substitution information of the access feature information, and is input into the preset algorithm. For specific descriptions of the preset algorithm and the input information thereof, refer to the following descriptions.

Finally, when a request for writing new data is received, the data in the cache system is evicted based on the eviction priority, to write the new data into the cache system. For a specific write and read process, refer to FIG. 11 and descriptions thereof.

Figure 6:
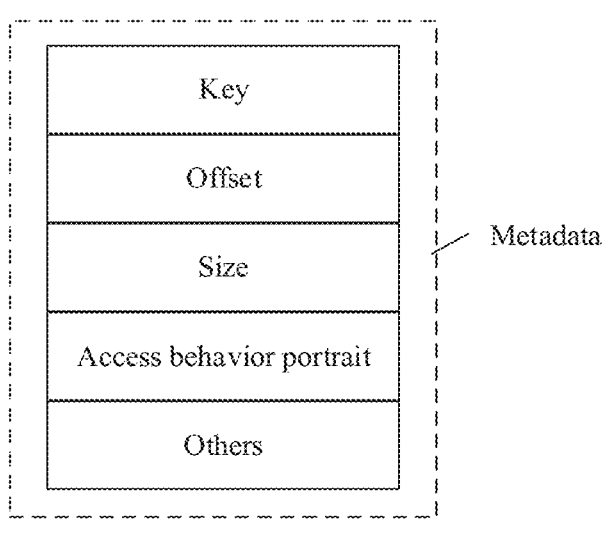
FIG. 6 is a schematic diagram of an example of a data structure of metadata according to an embodiment of this application.

FIG. 6 is a schematic diagram of an example of a data structure of metadata. In FIG. 6, one piece of metadata includes a key, an offset, a size, an access behavior portrait, and other data. The key is a unique identifier corresponding to each piece of data. The key is used for storage and retrieval. For example, the key may be a hash value corresponding to a URL. The offset indicates a location of data corresponding to the metadata in a data storage area, for example, a location in a disk. The size indicates a size of the data corresponding to the metadata. The access behavior portrait is an access behavior recording method provided in this application. The access behavior portrait uses a storage idea similar to a bitmap, compresses information such as an access time, a frequency, and an interval of a storage object, and stores compressed information in several bits. Other information stored in the metadata in FIG. 6 may further include, for example, information such as whether the data is a first clip of a file or whether it is a first frame of a video.

In a possible implementation, to distinguish between different access behaviors, popularity of data in a cache system may be graded based on an access frequency. The access frequency is a quantity of times or a frequency of accessing cached data in a time period corresponding to a part of an eviction period. For example, when the access frequency is used as a basis for describing access popularity in the behavior portrait, different popularity levels are shown in FIG. 7.

Figure 7:
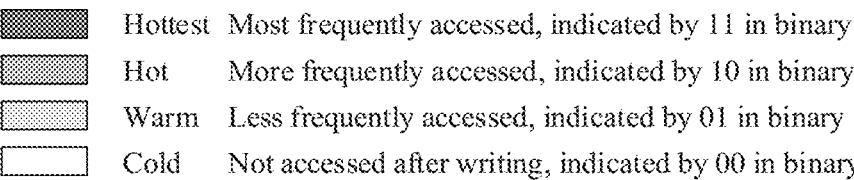
FIG. 7 is a schematic diagram of an example of a popularity grading method according to an embodiment of this application.

FIG. 7 is a schematic diagram of an example of a popularity grading method. As shown in FIG. 7, binary values of 11, 10, 01, and 00 respectively indicate four access popularity levels of an access object: most frequently accessed, more frequently accessed, less frequently accessed, and not accessed. The four popularity levels respectively correspond to four different grayscale color blocks in FIG. 7, that is, cold, warm, hot, and hottest from light to deep.

In a possible implementation, a simple policy, a machine learning algorithm, or the like may be used for dividing the access popularity levels in FIG. 7. For example, if a quantity of access times of a cached object is greater than 5, the cached object is hot; if a quantity of access times of a cached object is 3 to 5 times, the cached object is less hot; if a quantity of access times of a cached object is 1 to 2 times, the cached object is warm; and if a quantity of access times of a cached object is 0 times, the cached object is cold. These cached objects respectively correspond to 11, 10, 01, and 00 in FIG. 7. For example, in this division manner, an access portrait in metadata may be recorded in a bitmap format shown in FIG. 8.

In an access behavior portrait in this embodiment of this application, an eviction period of a cached object is divided into n parts (n is an integer greater than 1), to form an access sequence. The eviction period is a time range between two eviction behaviors of a cache system. With continuous progress of the eviction period, an access behavior record of cached data in the access sequence is updated. A probability of accessing the data in the future may be predicted according to an artificial intelligence algorithm based on access behavior information recorded in the behavior portrait, that is, the access behavior portrait.

In an optional implementation, the access behavior portrait is generated by equally dividing an eviction period into n parts according to a time sequence, to form a time-sequenced access sequence. The sequence includes an access frequency and time information of the data. As time advances and periods change, an access behavior portrait (a time-sequenced access sequence) corresponding to a piece of data is dynamically updated.

Figure 8:
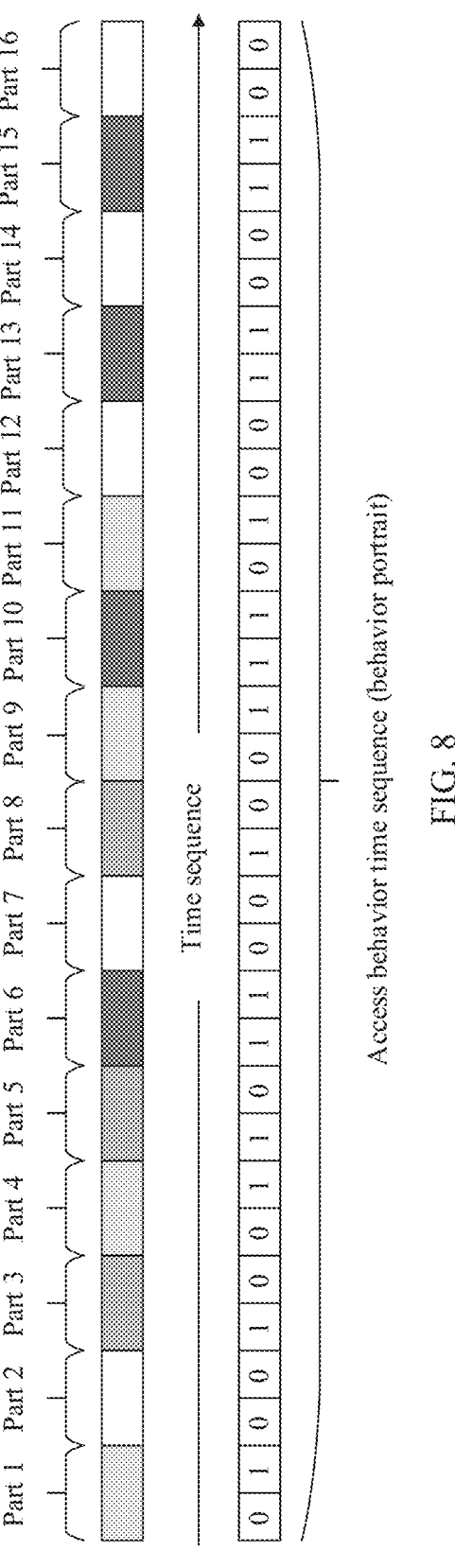
FIG. 8 is a schematic diagram of an example of a data structure of an access behavior portrait according to an embodiment of this application.

FIG. 8 is a schematic diagram of an example of a data structure of an access behavior portrait according to an embodiment of this application. In a possible embodiment, the access behavior portrait occupies a size of 32 bits. In FIG. 8, each grid of a bitmap indicates 1-bit data, and the 32 bits are divided into 16 parts (that is, n=16). The 16 parts equally divide one eviction period into 16 parts, each part occupies two bits, and every two bits indicate a popularity level of a cached object in a corresponding time period. In a cache system with a large capacity, for example, at a PB level, a portrait results in high memory consumption. Therefore, storage of the behavior portrait needs to be simplified. In the example (FIG. 8) of this embodiment of this application, the portrait occupies 4 bytes, and occupies a same memory (for example, ATS hits) as a cache of hits in a conventional record.

Figure 9:
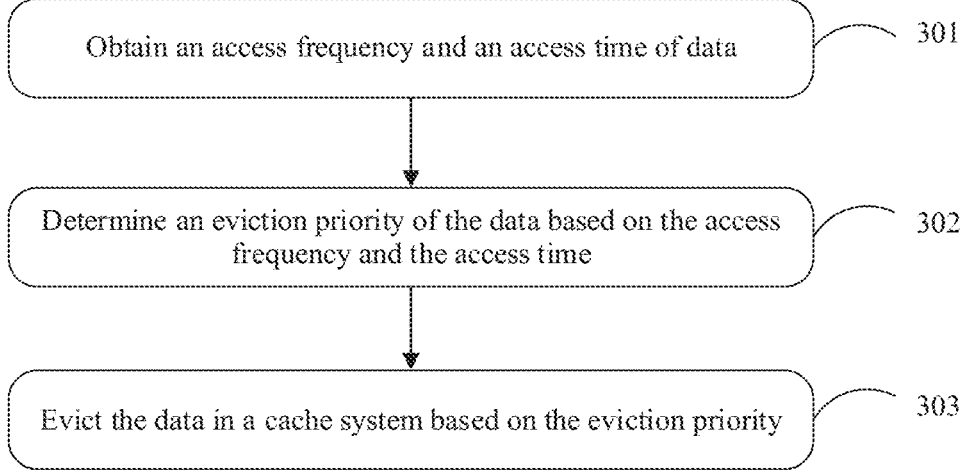
FIG. 9 is a schematic flowchart of an example of a data eviction method according to an embodiment of this application.

FIG. 9 is a schematic flowchart of an example of a data eviction method according to an embodiment of this application. The schematic flowchart shows a method for performing data eviction in a cache system, and the method is applicable to the cache system in FIG. 4. Steps are described as follows:

Step 301: Obtain an access frequency and an access time of data.

The cache system 200 obtains the access frequency and the access time of the data. In this embodiment of this application, the access frequency indicates a quantity of times that the data is accessed in a part (a time subperiod) of an eviction period. One eviction period may be divided into more than one time subperiod. The access time indicates a time at which the time subperiod is located, where the access frequency occurs in the time period. In an implementation, for example, the access time may be obtained as a start time point of the time subperiod.

Step 302: Determine an eviction priority of the data based on the access frequency and the access time.

First, after the access frequency and the access time are obtained in the foregoing step 301, an access behavior time sequence of the data in one eviction period may be constructed, that is, a behavior portrait in this embodiment of this application. In a possible embodiment, the behavior portrait may be stored in metadata in a bitmap manner. In a possible embodiment, the access frequency may be further divided into different popularity levels. For example, when the access frequency is divided into four levels, the access frequency may be stored in four binary forms: 00, 01, 10, and 11, to effectively reduce storage space. For example, the access time portrait in FIG. 8 is bitmap data that occupies 4 bytes and is divided into 16 time-sequenced time subperiods, that is, parts 1 to 16 in FIG. 8. For details, refer to the foregoing descriptions.

Figure 10:
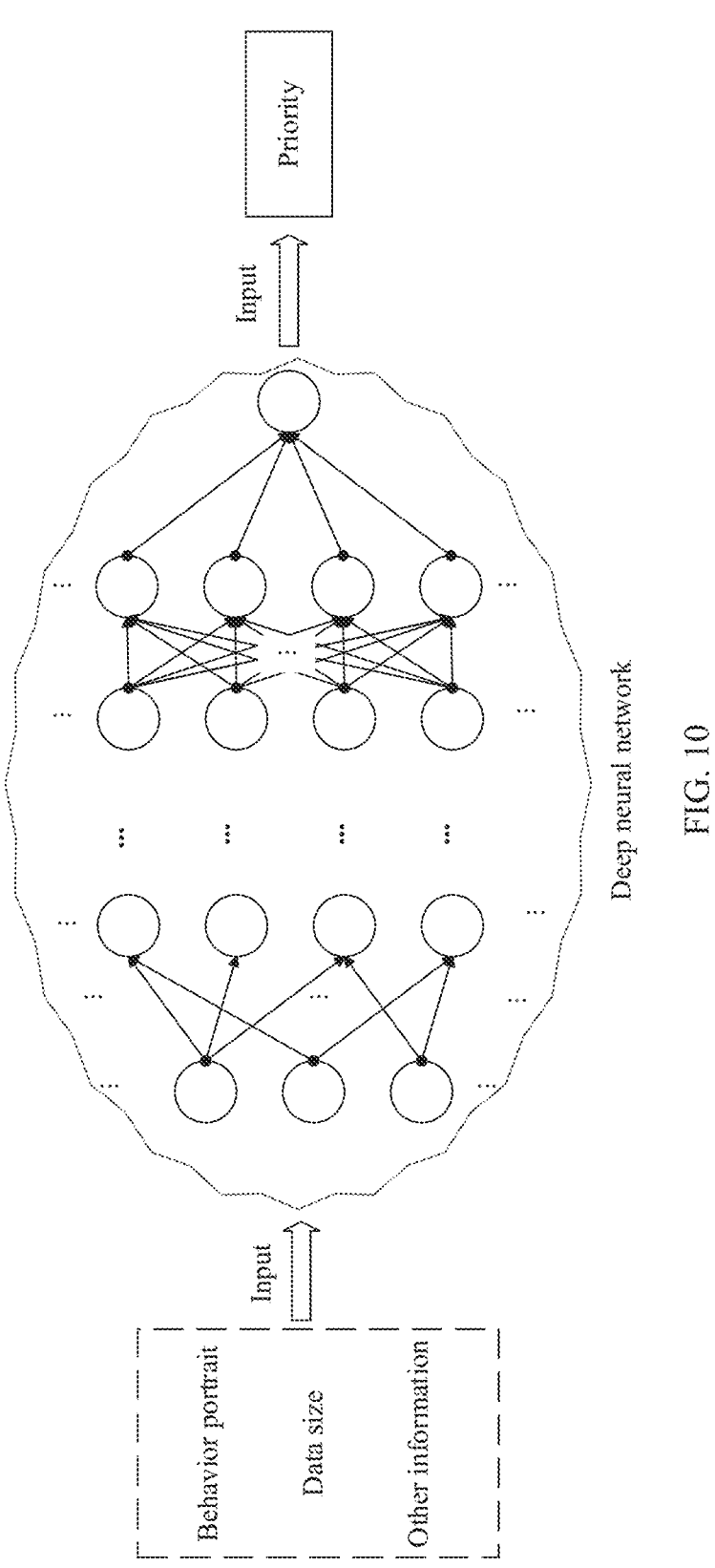
FIG. 10 is a schematic diagram of an example of a cached object priority calculation method according to a deep learning method according to an embodiment of this application.

Then, the behavior portrait, a data size, and other information are extracted from the metadata, and used as an input into a preset eviction algorithm. In a possible embodiment, the preset eviction algorithm may be an algorithm based on a deep learning framework, for example, a deep neural network (DNN). For example, as shown in FIG. 10, a behavior portrait, a data size, and other information are extracted from metadata as input parameters of a deep neural network DNN. After the DNN performs learning, a prediction model may be output, and the model calculates an eviction priority of an object stored in a cache system.

In an example of an application scenario, when the data is video data, other information in FIG. 10 may further include whether the data is a first frame of a video.

In an example of an application scenario, when the data is file data, other information in FIG. 10 may further include whether the data is a first clip of a file.

In an optional implementation, for example, information such as a quantity of access times, an access time interval, a last access time and a degree of access aggregation of the data in the eviction period is calculated based on the behavior portrait in FIG. 10. The information is used as supplementary or substitution information of the behavior portrait, and is input into the deep neural network shown in FIG. 10, to obtain a data eviction priority. The degree of access aggregation indicates an aggregation situation of a data access behavior in the eviction period. For example, in a possible implementation, user-defined weighting is performed on popularity of different time subperiods, to obtain an access behavior aggregation value. The value may describe an aggregation feature of the access behavior in the eviction period.

Optionally, the preset eviction algorithm may alternatively be a clocked least frequently used by size (CLFUS) algorithm, a least recently used (LRU) algorithm, a least frequently used (LFU) algorithm, or another similar eviction algorithm. An input into the algorithm may be properly adjusted based on an algorithm requirement.

Optionally, the preset eviction algorithm may be a logistic regression algorithm or a machine learning algorithm, and an input into the algorithm may be properly adjusted based on an algorithm requirement.

Step 303: Evict the data in the cache system based on the eviction priority.

In a possible implementation, after the eviction priority of the data in the cache system is calculated, the cache system 200 determines to-be-evicted data objects based on a priority threshold, and deletes these objects and metadata corresponding to these objects from a data storage area.

Figure 11:
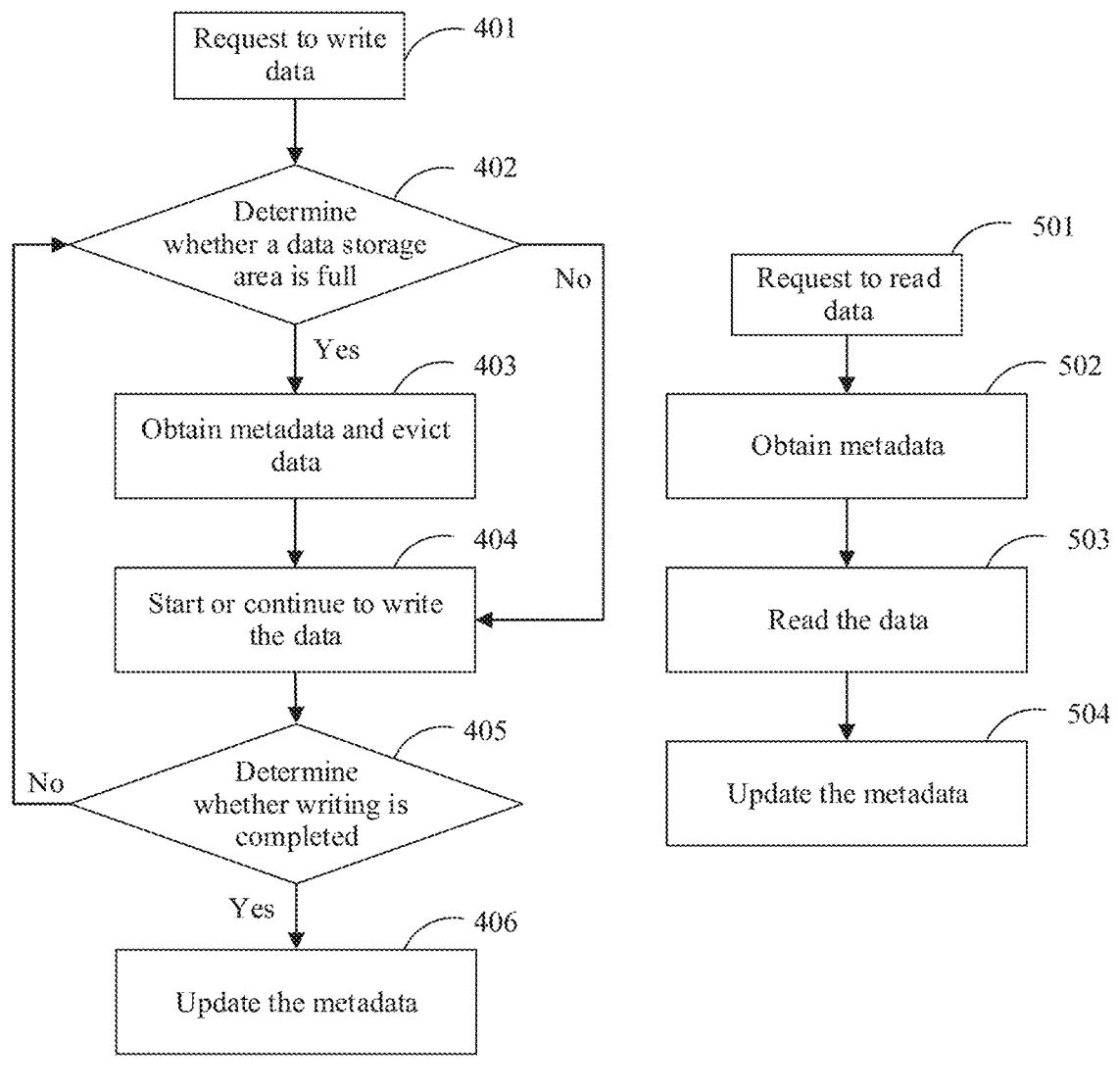
FIG. 11 is a schematic flowchart of an example of a data eviction method according to an embodiment of this application.

FIG. 11 is a schematic flowchart of an example of a data eviction management method according to an embodiment of this application. The method is applicable to the cache system 200 in FIG. 4, including a schematic diagram of an example of a data writing procedure in (a) in FIG. 11 and a schematic diagram of an example of a data reading procedure in (b) in FIG. 11. In the data writing procedure in (a) in FIG. 11, steps are described as follows:

Step 401: Request to write data.

For example, an exterior sends a request for writing the data to the cache system. The exterior may include a client device, another service device in a CDN cache network, and a device in another large-capacity cache system. A request manner may include a call request for calling a module, a component, or an interface, an http request, or the like.

Step 402: Determine whether a data storage area is full.

After receiving the write request or in a data writing process, the cache system 200 needs to determine whether the data storage area is full. If space of the data storage area is full, go to step 403. If the space of the data storage area is not full, go to step 404.

Step 403: Obtain metadata and evict data.

For example, in a possible implementation, the cache system 200 selects information such as an access behavior time sequence (a behavior portrait), a data size, and whether the data is a first frame of a video or a first clip of a file from the metadata, and uses the information as an input into a preset eviction algorithm of the cache system 200. The preset algorithm calculates an eviction priority of data corresponding to the metadata, and the cache system 200 evicts the data based on a set priority threshold. For more descriptions, refer to the foregoing descriptions.

Step 404: Start or continue to write the data.

Start or continue to write the data into the data storage area of the cache 200, and perform determining in step 405.

Step 405: Determine whether writing is completed.

If writing the current data is not completed, go back to step 402. If writing the current data is completed, go to step 406.

Step 406: Update the metadata.

After the data is written, corresponding metadata is added for the newly written data. In a possible implementation, the metadata includes other information such as a key, an offset, a size, and an access behavior portrait. For related descriptions, refer to the foregoing descriptions.

In the data reading procedure in (b) in FIG. 11, steps are described as follows:

Step 501: Request to read data.

For example, an exterior sends a request for reading the data to the cache system. For related descriptions, refer to step 401 in (a) in FIG. 11.

Step 502: Obtain metadata.

The cache system 200 obtains the metadata corresponding to the data in the read request, and extracts some key information in the metadata, such as a key and an offset.

Step 503: Read the data.

Content of the data corresponding to the metadata is read from the data storage area based on the key information of the metadata obtained in step 502, and the data is returned to an application programming interface 204. The application programming interface 204 sends the read data to an external device. For example, the external device may be a client.

Step 504: Update the metadata.

After reading the data is completed, information in the corresponding metadata is updated for the data, for example, an access behavior portrait in the metadata is updated. In a possible implementation, first, a current reading time needs to be obtained, and which time subperiod (for example, a part 1 to a part 16 in FIG. 8) in the eviction period the current reading time is located in is determined. Then, an access frequency (including a previous quantity of access times and a current quantity of access times) in the current time subperiod is obtained. Finally, for example, a behavior portrait record in the current time subperiod is updated based on an access popularity level. For example, when a quantity of access times in a part 3 of the behavior portrait in FIG. 8 increases from 5 to 6, a binary record corresponding to the part 3 is updated from "10" to "11". For detailed descriptions, refer to the foregoing descriptions.

Figure 12:
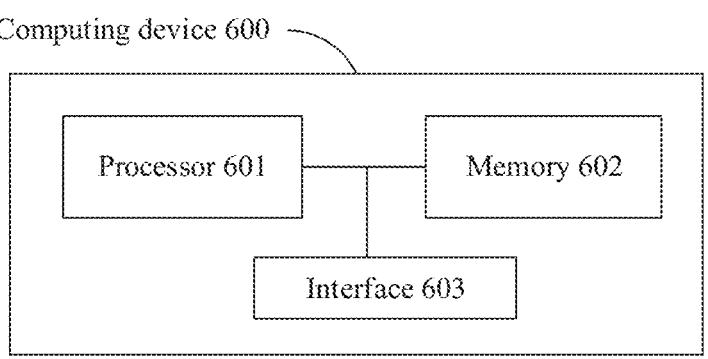
FIG. 12 is a schematic diagram of a hardware structure of a cache node 600 according to an embodiment of this application.

An embodiment of this application further provides a cache node 600, as shown in FIG. 12. The computing device 600 may be the cache node 102 or the upper-layer cache node 104. The cache node 600 includes a processor 601, a memory 602, and an interface 603.

The processor 601 may be a central processing unit (CPU), or may be a field programmable gate array (FPGA) or another processor chip. Alternatively, an FPGA or another processor chip, and a CPU jointly serve as the processor. The processor 502 may communicate with the interface 203. The processor executes computer instructions in the memory 502 to perform a management and data access operation on a storage system.

The memory 503 may include a random access memory (RAM), a mechanical hard disk drive (HDD), a solid-state drive (SSD), or another device or memory instance having a storage capability. The solid-state drive may also be referred to as a solid-state drive (SSD). The memory 502 in this embodiment of the present invention may provide a memory for the CPU, and the memory may be configured to store content of metadata in this embodiment of the present invention. The memory 502 stores executable program code. The processor 502 executes the executable program code to implement a function of the cache node 102 or 104.

The interface 504 may be a network interface card (NIC), a host bus adapter (HBA), or the like.

What is claimed is:

1. A data eviction method, wherein the data eviction method comprises:

obtaining an access frequency and an access time of data;

dividing an eviction period of the data into a plurality of subperiods;

determining a quantity of access times of the data during each of the plurality of subperiods based on the access frequency and the access time of the data;

classifying each of the plurality of subperiods into a popularity level based on the quantity of access times of the data during a respective subperiod, wherein the popularity level corresponds to a predetermined range of the quantities of access times of the data during the respective subperiod;

determining an access behavior time sequence of the data based on the popularity level of each of the plurality of subperiods;

determining an eviction priority of the data based on the access behavior time sequence; and evicting the data in a cache system based on the eviction priority.

2. The data eviction method according to claim 1, wherein the access frequency is a quantity of access times in a target time period, and the target time period is a part of the eviction period.

3. The data eviction method according to claim 1, wherein the determining an eviction priority of the data based on the access behavior time sequence comprises:

inputting the access behavior time sequence into a preset algorithm; and calculating the eviction priority of the data in the cache system.

4. The data eviction method according to claim 3, wherein the preset algorithm comprises one or a combination of the following:

a deep learning algorithm, a machine learning algorithm, a clocked least frequently used by size (CLFUS) algorithm, a least recently used (LRU) algorithm, or a least frequently used (LFU) algorithm.

5. The data eviction method according to claim 1, wherein the determining an eviction priority of the data based on access behavior time sequence further comprises:

determining access feature information based on the access behavior time sequence;

inputting the access feature information into a preset algorithm; and calculating the eviction priority of the data in the cache system.

6. The data eviction method according to claim 5, wherein the access feature information comprises one or a combination of the following:

a quantity of access times, an access time interval, a last access time, or a degree of access aggregation.

7. The data eviction method according to claim 1, wherein the evicting the data in a cache system based on the eviction priority comprises:

when a request for writing new data is received, evicting the data in the cache system based on the eviction priority to write the new data into the cache system.

8. A cache node, wherein the cache node comprises:

at least one processor; and one or more memories coupled to the at least one processor and storing programming instructions for execution by the at least one processor to:

obtain an access frequency and an access time of data;

divide an eviction period of the data into a plurality of subperiods;

determine a quantity of access times of the data during each of the plurality of subperiods based on the access frequency and the access time of the data;

classify each of the plurality of subperiods into a popularity level based on the quantity of access times of the data during a respective subperiod, wherein the popularity level corresponds to a predetermined range of the quantities of access times of the data during the respective subperiod;

determine an access behavior time sequence of the data based on the popularity level of each of the plurality of subperiods;

determine an eviction priority of the data based on the access behavior time sequence; and evict the data in a cache system based on the eviction priority.

9. The cache node according to claim 8, wherein the access frequency is a quantity of access times in a target time period, and the target time period is a part of the eviction period.

10. The cache node according to claim 8, wherein the determining an eviction priority of the data based on the access behavior time sequence comprises:

inputting the access behavior time sequence into a preset algorithm; and calculating the eviction priority of the data in the cache system.

11. The cache node according to claim 10, wherein the preset algorithm comprises one or a combination of the following:

a deep learning algorithm, a machine learning algorithm, a clocked least frequently used by size (CLFUS) algorithm, a least recently used (LRU) algorithm, or a least frequently used (LFU) algorithm.

12. The cache node according to claim 8, wherein the determining an eviction priority of the data based on the access behavior time sequence further comprises:

determining access feature information based on the access behavior time sequence;

inputting the access feature information into a preset algorithm; and calculating the eviction priority of the data in the cache system.

13. The cache node according to claim 12, wherein the access feature information comprises one or a combination of the following:

a quantity of access times, an access time interval, a last access time, or a degree of access aggregation.

14. The cache node according to claim 8, wherein the evicting the data in a cache system based on the eviction priority comprises:

when a request for writing new data is received, evicting the data in the cache system based on the eviction priority to write the new data into the cache system.

15. A non-transitory computer-readable storage medium, wherein the non-transitory computer-readable storage medium stores programing instructions for execution by at least one processor to:

obtain an access frequency and an access time of data;

divide an eviction period of the data into a plurality of subperiods;

determine a quantity of access times of the data during each of the plurality of subperiods based on the access frequency and the access time of the data;

classify each of the plurality of subperiods into a popularity level based on the quantity of access times of the data during a respective subperiod, wherein the popularity level corresponds to a predetermined range of the quantities of access times of the data during the respective subperiod;

determine an access behavior time sequence of the data based on the popularity level of each of the plurality of subperiods access frequency and the access time by dividing an eviction period of the data into a plurality of subperiods, wherein each of the plurality of subperiods is associated with a respective popularity level that is determined based on an access frequency of the data during a respective subperiod;

determine an eviction priority of the data based on the access behavior time sequence; and evict the data in a cache system based on the eviction priority.

16. The non-transitory computer-readable storage medium according to claim 15, wherein the access frequency is a quantity of access times in a target time period, and the target time period is a part of the eviction period.

17. The non-transitory computer-readable storage medium according to claim 15, wherein the determine an eviction priority of the data based on the access behavior time sequence comprises:

input the access behavior time sequence into a preset algorithm; and calculate the eviction priority of the data in the cache system.

\*    \*    \*    \*    \*